US 6,893,477 B2

United States Patent
Uchino et al.

(10) Patent No.: US 6,893,477 B2
(45) Date of Patent: May 17, 2005

(54) CERIUM-BASED ABRASIVE MATERIAL SLURRY AND METHOD FOR PRODUCING CERIUM-BASED ABRASIVE MATERIAL SLURRY

(75) Inventors: Yoshitsugu Uchino, Tokyo (JP); Kazuya Ushiyama, Tokyo (JP)

(73) Assignee: Mitsui Mining & Smelting Co, Ltd., Tokyo (JP)

( * ) Notice: Subject to any disclaimer, the term of this patent is extended or adjusted under 35 U.S.C. 154(b) by 0 days.

(21) Appl. No.: 10/416,470

(22) PCT Filed: Sep. 12, 2002

(86) PCT No.: PCT/JP02/09330
§ 371 (c)(1),
(2), (4) Date: May 12, 2003

(87) PCT Pub. No.: WO03/025085
PCT Pub. Date: Mar. 27, 2003

(65) Prior Publication Data
US 2004/0031206 A1 Feb. 19, 2004

(30) Foreign Application Priority Data
Sep. 17, 2001 (JP) .................................. 2001-281438

(51) Int. Cl.$^7$ .............................. C09G 1/02; C09G 1/04
(52) U.S. Cl. .............................. 51/307; 51/309; 106/3; 423/263

(58) Field of Search ....................... 51/307, 309; 106/3; 423/263

(56) References Cited

U.S. PATENT DOCUMENTS 6,551,175 B2 * 4/2003 Koichi et al. ................. 451/41

FOREIGN PATENT DOCUMENTS

| JP | 2001-11432 A | 1/2001 |
| JP | 2001-35818 A | 2/2001 |
| JP | 2001-89748 A | 4/2001 |
| JP | 2002-194334 A | 7/2002 |

* cited by examiner

Primary Examiner—Michael Marcheschi
(74) Attorney, Agent, or Firm—Rothwell, Figg, Ernst & Manbeck, P.C.

(57) ABSTRACT

The present invention provides a cerium-based abrasive slurry particles including a cerium-based abrasive particle of no less than 95% by weight of total rare earth oxides (TREO), in which the cerium-based abrasive particle has less than 3% by weight of fluorine content of TREO, and a particle size distribution determined by a laser diffraction method is within a predetermined range. And adhesion property is further improved by setting this fluorine content in 0.005 to 0.5% by weight of TREO.

15 Claims, 3 Drawing Sheets

CERIUM-BASED ABRASIVE MATERIAL SLURRY AND METHOD FOR PRODUCING CERIUM-BASED ABRASIVE MATERIAL SLURRY

CROSS-REFERENCE TO RELATED APPLICATIONS

The present application is a national stage filing under 35 U.S.C. § 371 of PCT/JP02/09330, filed on Sep. 12, 2002, designating the U.S.

TECHNICAL FIELD

The present invention relates to a cerium-based abrasive slurry and to a method for manufacturing the same. Specifically, it relates to a cerium-based abrasive slurry providing a little residue and adhesion of abrasive particles on a surface of materials to be polished after polishing.

BACKGROUND ART

A cerium-based abrasive including cerium-based particles as a principal component has extended its use quickly based on an outstanding polishing effect. Now, it is used for not only a conventional glass polishing use for optics, but also fields of glass polishing for liquid crystal magnetic recording media such as a hard disk, and manufacturing of electronic circuits including LSI.

Generally the cerium-based abrasive is manufactured by following methods. That is, after material is slurried, wet pulverized and treated with mineral acids etc. if needed, chemical treatment is performed through hydrofluoric acid, ammonium fluoride, etc. The obtained slurry is filered, dried and roasted, and subsequently, pulverization and a classification are performed and abrasive particles having a desired particle size are obtained. Moreover, as a raw material of the cerium-based abrasive, rare earth raw materials, such as rare earth carbonate, rare earth hydroxide, and rare earth oxalate, or rare earth oxide raw materials obtained by calcinating these materials are used. These rare earth raw materials are usually manufactured by removing some rare earths (Nd, Pr, etc.), radioactive elements, etc. by chemical treatment from bastnaesite based rare earth raw materials or cerium containing rare earth raw materials. Moreover, usually the cerium-based abrasive is used in a state of slurry dispersed in dispersion media, such as water.

Then, it is required that a high polishing velocity might be demonstrated as a premise to cerium-based abrasive slurry, and further that manufacture of polished face having outstanding specular surface property might be enabled. This is a characteristic required not only for cerium-based abrasives slurry, but for general abrasives. On the other hand, not only excellent polishing characteristics, but improvement in other properties are required.

As one of new characteristics required to cerium-based abrasive slurry, adhesion property of abrasive particles onto a surface of materials to be polished may be mentioned. This relates to highly precise polished face formation to be on demanding in a field for which the cerium-based abrasive is used. That is, if the abrasive particles in the abrasive slurry has a high adhesion, the abrasive particles will remain on a material to be polished surface after washing. And the residual abrasive particles cause a blemish depending on subsequent handling, and will injure an accuracy of a polished face as a result. And for example, when a material to be polished is a substrate for hard disks, such existence of residual particles makes a factor that deteriorates flat and smooth property of the substrate, when a magnetic substance is vapor-deposited after polishing.

On the other hand, in examples of examination on conventional abrasive or abrasive slurry, many examples exist in a filed about an improvement of polishing properties. However, sufficient solution is not yet proposed and coexistence between polishing properties and dispersibility is not achieved in adhesive improvement of abrasive particles in abrasive slurry.

The present invention is made in view of the above described actual circumstances, and aims at providing a cerium-based abrasive slurry in which abrasive particles do not adhere to a polished face after polishing, and formation of a blemish is not given after polishing, but a highly precise specular surface is maintained while having outstanding polishing power and outstanding polishing accuracy. Moreover, a method for manufacturing such a cerium-based abrasive slurry is also provided.

DISCLOSURE OF THE INVENTION

To solve the problem, firstly, the present inventors had examined reasons by which conventional cerium-based abrasive particles adhere to a material to be polished, and reached the following considerations. In conventional cerium-based abrasives, fluorine is included no less than 3% (based on TREO (total rare earth oxides)). In cerium-based abrasives, fluorine is included so that reservation of polishing power of the cerium-based abrasive might be realized. That is, although mechanical polishing actions by abrasive particles comprising cerium oxide etc. are main actions in a conventional cerium-based abrasive, in addition, chemical polishing action is also demonstrated simultaneously to improve its polishing power, where corrosion of a material to be polished is promoted with fluorides formed on the material to be polished surface with the fluorine included.

Although the fluorine component is thus regarded indispensable for polishing power reservation in conventional cerium-based abrasives, on the other hand, based on a reactivity of fluorine, during or after polishing, it probably gives a factor of adhering of abrasive particles to a surface of the material to be polished. The present inventors firstly took notice of the point, and considered that a cerium-based abrasive having low adhesivity could be obtained by reducing reactivity between abrasive particles and a material to be polished. And also the present inventors considered that an amount of fluorine in the cerium-based abrasive should preferably be reduced for the purpose. (If possible, a condition completely free of fluorine might be realized.)

On the other hand, in polishing mechanism of the cerium-based abrasive as mentioned above, chemical action by existence of fluorine has a large percentage in polishing action, simply reducing amount of fluorine in conventional abrasive to decrease in adhesion may also reduce polishing capability of the abrasive slurry to impair its original function.

Then, as a result of examination of the present inventors to obtain a cerium-based abrasive slurry having a high polishing velocity even in the case where fluorine was reduced, this problem was solved by controlling some characteristics of the abrasive. And it was found out that most effective characteristics are controlling a particle diameter and a particle size distribution of abrasive particles in a predetermined range, and thus the present invention was accomplished.

That is, in the present invention, a cerium-based abrasive slurry including cerium-based abrasive of no less than 95% by weight of TREO is provided, wherein a fluorine content to TREO in the above described cerium-based abrasive is less than 3% by weight, and cumulative 10% particle diameter ($D_{10}$), cumulative 50% particle diameter ($D_{50}$), cumulative 90% particle diameter ($D_{90}$), and a maximum particle diameter ($D_{max}$) by a laser diffraction method are in following ranges.

$0.1 \; \mu m \leq D_{10} \leq 0.6 \; \mu m$
$0.2 \; \mu m \leq D_{50} \leq 1.0 \; \mu m$
$0.3 \; \mu m \leq D_{90} \leq 1.5 \; \mu m$
$0.5 \; \mu m \leq D_{max} \leq 5.0 \; \mu m$ Here, the fluorine content is set less than 3% by weight, because it is needed to be set at least less than this figure as a fluorine concentration that does not form adhesion phenomenon by fluorine in abrasive particles. And when relationship between performance as an abrasive and adhesion of abrasive particles is taken into consideration, especially this fluorine content is preferably set in a range 0.005 to 0.5% by weight. A minimum value of a fluorine content is set 0.005%, because when an amount of cerium oxides in the cerium-based abrasive is low, and especially when an amount of cerium oxides is no more than 70% (based on TREO), a condition completely free of fluorine will shorten a life of the abrasive.

And in the present invention, a maximum particle diameter, and a cumulative size distribution of a particle diameter of an abrasive particle are controlled in a cerium-based abrasive slurry with a low fluorine content. Here, while a maximum particle diameter ($D_{max}$) is set in a range of 0.5 to 5.0 $\mu$m, because a scratch will occur in a polished face and polishing accuracy will be injured remarkably when $D_{max}$ is no less than 5.0 $\mu$m, and because when $D_{max}$ is set less than 0.5 $\mu$m excessively fine particle diameter will not give sufficient polishing velocity. On the other hand, in a particle size distribution, a desirable particle size distribution of the abrasive particle is specified strictly by controlling particle size distribution in three points; a cumulative 10% particle diameter ($D_{10}$); a cumulative 50% particle diameter ($D_{50}$); and a cumulative 90% particle diameter ($D_{90}$). These range are defined in cumulative particle diameter distribution, firstly in the cumulative 10% particle diameter, because when this is set less than 0.1 $\mu$m, excessively fine abrasive particle is obtained to induce a problem of adhesiveness apart from a problem by fluorine, and because a particle diameter exceeding 0.6 $\mu$m may give a tendency of formation of polishing scratch. Moreover, in a cumulative 50% particle diameter, it is because a particle diameter of less than 0.2 $\mu$m gives inadequate polishing power and inferior polishing velocity, and a particle diameter exceeding 1.0 $\mu$m shows a tendency of forming polishing scratch. And in a cumulative 90% particle diameter, while a particle diameter of less than 0.3 $\mu$m gives inferior polishing velocity and further gives much adhering abrasive particle, a particle diameter exceeding 1.5 $\mu$m easily forms polishing scratch. In addition, more preferable ranges further limited is $0.2 \leq D_{10} \leq 0.4 \; \mu m$, $0.3 \leq D_{50} \leq 0.6 \; \mu m$, $0.5 \leq D_{90} \leq 0.8 \; \mu m$, and $0.8 \leq D_{max} \leq 3.0 \; \mu m$.

In addition, these particle size distributions are defined on the basis of measurement by a laser diffraction method. A laser diffraction method is a technique in which an abrasive is dispersed in a dispersion medium, irradiated by a laser light, and a diffraction figure is obtained by condensing a diffuse light (forward scattering light) generated to give a particle size distribution. In the present invention, a laser diffraction method is set as a basis because the method can measure the particle size distribution of the abrasive comparatively simply and promptly, and because it excels also in measurement accuracy.

As mentioned above in the present invention, a cerium-based abrasive slurry is obtained that does not have adhesion onto a polished face, and that provides sufficient polishing velocity, by limiting a particle diameter and a particle size distribution of an abrasive particle within a predetermined range, while controlling a fluorine content to a low concentration. And according to the present inventors, if a polishing velocity and accuracy of a polished face are taken into consideration, these performances are securable at a higher level by controlling following two characteristics.

A first characteristic for improving a polishing velocity and accuracy of a polished face is a diameter of a crystallite and a crystal lattice constant of crystallite constituting the abrasive particle. An abrasive particle is an aggregate of a single crystal and a crystallite is a single crystal of a rare earth oxide containing a cerium oxide or cerium constituting this abrasive particle. And a diameter of a crystallite in the present invention represents a size of this single crystal in a direction of a plane (111). On the other hand, a lattice constant represents a constant specifying a size and form of a unit cell constituting the single crystal. In the present invention, a cerium-based abrasive having outstanding polishing velocity and accuracy of a polished face is obtained by specifying this diameter of a crystallite, and a lattice constant of the crystal constituting a crystallite. And in the present invention, it is preferable that a diameter of a crystallite is 10 to 50 nm, and a lattice constant is 0.545 to 0.555 nm. A diameter of a crystallite is a size of a single crystal constituting an abrasive particle, and a polishing velocity will become larger if the diameter of the crystallite becomes larger, but scratch is easily formed, and moreover if the diameter of the crystallite is small, scratch formation will be inhibited, but on the other hand a polishing velocity will become exceedingly lower. Moreover, in a lattice constant, although a large lattice constant will provide a hard crystal to give a high polishing velocity, a scratch will be formed, and conversely a small lattice constant gives a soft crystal to reduce polishing power. The above described range is specified in consideration of the above reasons. In addition, a value of a diameter of these crystallites and a crystal lattice constant are based on a value measured by a powder X-ray diffraction analysis that is a general measuring method.

A second characteristic for improving a polishing velocity and accuracy of a polished face is a specific surface area of an abrasive particle. And in the present invention, a range of this specific surface area is specified as 3 to 30 m$^2$/g. In the case of less than 3 m$^2$/g, polishing scratch is easily formed, and a polishing velocity becomes smaller when exceeding 30 m$^2$/g. In the specific surface area of an abrasive, the abrasive slurry in dried state, in detail, dried at 105° C. is measured by a BET adsorption method, and obtained value is specified as a base.

In the above described cerium-based abrasive slurry in which a fluorine content and a particle size distribution, further a diameter of crystallites, a lattice constant and a specific surface area are controlled, a ratio of cerium oxide to TREO is preferably no less than 30% by weight. It is because a polishing velocity becomes extremely lower in case of less than 30%. Especially in order to obtain an abrasive having a large polishing velocity and a polishing power maintained for a long period of time, it is preferably specified to no less than 90%, but if it becomes no less than 99.99%, raw material cost will become higher.

In a cerium-based abrasive slurry according to the present invention, at least one of a group including a solidification inhibitor and a dispersant is preferably included, and especially preferably both of them are included. A solidification inhibitor here is an additive that softens precipitation of an abrasive particle, which occurs after an abrasive particle is dispersed in a dispersing medium, and a dispersant means an additive that disperses an abrasive particle in a dispersing medium. The solidification inhibitor involves silica, such as synthetic silica, colloidal silica, and fumed silica; alginic acid or alginic acid derivatives, such as sodium alginate and alginic acid propylene glycol ester; salt of aromatic sulfonic acid formalin condensates, such as sodium β-naphthalene sulfonic acid formalin condensate; calcium containing compounds, such as dibasic calcium phosphate; cellulose or cellulosics, such as crystal cellulose and sodium carboxymethylcellulose; and hydrogencarbonate, such as sodium hydrogencarbonate and an ammonium hydrogencarbonate. Moreover, a dispersant involves polystyrene sulfonate, such as sodium polystyrene sulfonate; condensed phosphoric acid or condensed phosphates, such as pyrophosphoric acid, sodium pyrophosphate, sodium tripolyphosphate, and sodium hexametaphosphate; and polycarboxylic acid type polymer compounds, such as polyacrylic acid, polymaleic acid, and acrylic acid-maleic acid copolymer, polyacrylate, polymaleate, and acrylic acid-maleic acid copolymer salts. In addition, these additives are selected based on a material to be polished, and although a problem will not occur using any additives in a usual glass materials, it is preferable to avoid application of an additive including alkali metals and alkaline earth metals in polishing of semiconductor materials. It is because an existence of alkali metals and an alkaline earth metal, such as sodium and calcium, is not desirable.

And an amount of addition of these solidification inhibitors and a dispersant is adjusted according to a specific surface area of an abrasive in a slurry, and when a specific surface area of a cerium-based abrasive is defined as S ($m^2/g$), it is desirable to be added by S/100 to S/5 g to 100 g of cerium-based abrasive particles. It is because that in a case of less than S/100 g, an effect as an additive is not demonstrated, and a difference is not observed in an effect when exceeding S/5 g. For example, when a specific surface area of an abrasive is in a range of 3 to 30 $m^2/g$ that is the above described suitable range, it is preferable to be added by 0.03 to 6 g (0.03 to 6% by weight) to 100 g of cerium-based abrasive particles. When adding independently, or when adding both, an amount of addition of these solidification inhibitor and dispersant, being set in the above described range is preferable. Moreover, when both of a solidification inhibitor and a dispersant are added, it is suitable for a ratio of an amount of solidification inhibitor addition and an amount of dispersant addition to be set as 1/20 to 20/1. In addition, these additives may be added before, during or after a finish pulverization described later, but it is preferable to be added before finish pulverization in order to reform a surface of the abrasive particle. However, when filtering is needed, addition before filtering is preferable to enable filtering easier.

A slurry concentration of a cerium-based abrasive slurry of the present invention (content of an abrasive particle) is preferably 10 to 60% by weight at the time of manufacture, and more preferably 20 to 60% by weight. It is because cost is needed for transportation or storage in a case that a concentration is less than 10% by weight, and because it is difficult to manufacture an abrasive slurry exceeding 60% by weight. And an abrasive slurry of the present invention is diluted and used for suitable concentration (0.1 to 30% by weight) when used. In addition, a cerium-based abrasive slurry of the present invention has excellent dispersibility even with a high concentration, and re-dispersion is possible when agitated by a usual agitator after long-term storage to provide almost same particle size distribution as when manufactured. Especially when a solidification inhibitor is added, even if precipitation is formed, a precipitation cake is soft to enable easy re-dispersion.

A cerium-based abrasive slurry of the present invention may be broadly applied to polishing of glass materials and semiconductor materials, and it is especially suitable for polishing of materials for liquid crystals, and substrate for magnetic recording media like hard disks.

Manufacturing methods for an abrasive slurry of the present invention will be described next. In a manufacturing method of an abrasive slurry according to the present invention, steps to a roasting step in a manufacturing method of general cerium-based abrasives are improved, and furthermore, a step is included in which a roasted material is slurried. Namely, manufacturing of a cerium-based abrasive includes a raw material slurrying step in which an abrasive raw material and a dispersion medium are mixed to obtain a raw material slurry; a raw material pulverizing step in which the raw material slurry is wet pulverized; and a roasting step in which the abrasive raw material after pulverization is roasted, and further a step in which the abrasive raw material after roasted is slurried. In the present invention, a particle diameter and its distribution of an abrasive particle are made to be within a limited range, while reducing a fluorine content. In addition, slurrying in the present invention includes a case where a step mixing a dispersion medium and a raw material (roasted material) is independent, and moreover includes a case where slurrying is carried out in early stages in a wet pulverizing step. For example, when a dispersion medium and a raw material (roasted material) are introduced into a wet pulverizing machine of a batch type and a pulverization is performed, both of slurrying and wet pulverization are performed there.

Here, reduction of fluorine concentration is enabled by performing a pulverization and roasting to an abrasive raw material, without performing fluorination processing currently performed in conventional manufacturing steps of an abrasive slurry. Moreover, since a fluorine component in a raw material volatilizes in a roasting step and thus an amount of addition of a fluorine may be reduced even if a conventional fluorination processing is carried out, an abrasive slurry having a low fluorine concentration according to the present invention may be obtained. That is, when performing fluorination processing, a final fluorine concentration of an abrasive slurry may be set to less than 3% by specifying a fluorine concentration in a raw material before a roasting no more than 3% to TREO.

And in the present invention, control of a particle diameter and a particle size distribution of abrasive particle is performed in a pulverizing step described below. Thus, a reason that a pulverizing step before a roasting step is considered as important is that; an abrasive raw material after roasting is hard, pulverization is difficult, and $D_{50}$ of the abrasive particle may be adjusted by pulverization after roasting but adjustment of $D_{90}/D_{10}$ after roasting is difficult, and thereby $D_{50}$ and $D_{90}/D_{10}$ of the raw material before roasting need to be set smaller in order to adjust $D_{90}/D_{10}$. That is, it is because that a pulverizing conditions before roasting is preferably specified in order to set the particle diameter of the abrasive in a desired range, and thus pulverizing cost may also be reduced.

A main pulverization is performed by wet media mill containing pulverizing media having an average volume of $1.4 \times 10^{-5}$ to $4.2 \times 10^{-3}$ $cm^3$/piece in this pulverizing step. Media having globular form are usually used as pulverizing media, and when the pulverizing media have globular form, a diameter is 0.3 to 2.0 mm. Pulverizing is performed in the present invention by pulverizing media having a small diameter in the range, because excessive time is needed, and it is inefficient to pulverize a raw material sufficiently small using pulverizing media having a large diameter, and because $D_{50}$ may be made into a proper range ignoring efficiency, but then $D_{90}/D_{10}$ becomes excessive to give a final particle size distribution of the abrasive out of a proper range. Then, as a result of examining a relationship among a final abrasive particle diameter, a raw material particle diameter before roasting, and a pulverizing media at the time of the raw material pulverization, the present inventors found out that a particle size distribution of the raw material particle after pulverization was made proper, and further that the particle size distribution of a final abrasive could be in the above described proper range by specifying pulverizing media in such a range. And as a particle size distribution of the raw material particle after pulverization in this case, properly $D_{50}$ is 0.3 to 3.0 µm and $D_{90}/D_{10}$ is no more than 10 according to the present inventors. It is because when $D_{50}$ is less than 0.3 µm, particle growth in subsequent roasting step becomes inadequate, and required polishing velocity is no longer obtained in the polishing step, and moreover pulverization after roasting becomes difficult and causes polish scratch in polishing step, when $D_{50}$ exceeds 3.0 µm.

And in the present invention, it is preferable to perform a pre pulverization described below before the above described main pulverization. It is not efficient to pulverize a raw material by pulverizing media having small diameter immediately, because a long time is needed to obtain an abrasive having a desired particle size distribution. Moreover, $D_{90}/D_{10}$ of a raw material particle after main pulverization may be made small by performing following pre pulverization. And following pre pulverization is performed independently, or suitably combined before the main pulverization.

As a first pre pulverization step, a step may be mentioned in which a wet pulverization by the pulverizing media having 1.4 to 1000 times of average volume of the pulverizing media used at the main pulverization step is performed. Thus, the raw material can be pulverized with sufficient degree and a pulverizing step by the pulverizing media of small size that is the main pulverization can be efficiently performed by performing beforehand wet pulverization using bigger pulverizing media than the media in the main pulverization. As examples of suitable wet media mills for this first pre pulverization step, a wet ball mill, an attritor, a vibration mill, etc. may be mentioned.

Moreover, as a second detail of the pre pulverization, a raw material is dipped in an aqueous solution at 60° C. to 100° C. Thus, by heating the raw material in a state dipped in an aqueous solution, the raw material decays, a particle diameter becomes smaller, and the raw material particle diameter after decay becomes further uniform. Although this step is different from general pulverizing step performed using pulverizing equipment, in the present invention, the pre pulverization before the main pulverization is performed using this phenomenon. This pre pulverization step is effective when rare earth carbonate or a raw material is used that shows a loss on ignition of 1 to 40% based on a dry weight and is obtained by calcining rare earth carbonate at 1000° C. after 1-hour heating. And heating temperature of this aqueous solution is 60° C. to 100° C. It is because the pulverization may not fully progress at less than 60° C., and it is because in order to heat at a temperature exceeding 100° C., special equipments, such as an autoclave, is needed etc. and it is industrially disadvantageous. Moreover, an aqueous solution in which the raw material is dipped includes water (pure water, industrial water, tap water, etc.) itself, a mixed solution of water-soluble organic solvents, such as alcohol, and acetone.

In addition, as an embodiment of this step, an embodiment in which the raw material is dipped into an aqueous solution before heating and then heating is performed; an embodiment in which the raw material is dipped into a heated aqueous solution; and an embodiment in which the raw material is dipped into a heated aqueous solution and then heating is further performed; may be considered, and any of them may be adopted. Moreover, a mixing ratio of the raw material and the aqueous solution (weight ratio) is not especially limited, the aqueous solution is preferably 0.5 times to 10 times of the raw material (a solid component when the raw material is a slurry). And, this pre pulverization method is effective even if it is performed after a main pulverization step.

And a third pre pulverization is a method of performing a dry pulverization before the main pulverization (wet pulverization). Since $D_{90}/D_{10}$ becomes comparatively large by the pulverization by media mills, such as a dry way ball mill, in this dry pulverization, it is carried out with the pulverizing means of other system, i.e., a pulverizing means to pulverize by impact, (a means to pulverize with impact by pin and hammer as impact mill, atomizer, etc.), and a pulverizing means to pulverize particles by collision in high-speed air current as in a jet mill.

In the present invention, the raw material is pulverized in the main pulverization and a proper pre pulverization as mentioned above. And a cerium-based abrasive according to the present invention may be obtained by roasting the raw material pulverized in this way. In addition, the raw material for which the main pulverization and the pre pulverization were performed, it is preferable to carry out roasting after filtrating, drying and cracking.

Here, a roasting temperature in the roasting step is preferably 800 to 1200° C. It is because sintering of an abrasive particle excessively progresses, a diameter of a crystallite becomes excessively large, and a lattice constant becomes large to cause scratch formation, when roasting temperature exceeds 1200° C. And, it is because sintering of an abrasive particle hardly advances, but a diameter of a crystallite becomes small, a lattice constant becomes small to give an abrasive of low polishing power when roasted at a temperature less than 800° C.

And, in order to control more strictly a final particle size distribution of a cerium-based abrasive, it is preferable that a finishing pulverization is performed in which a raw material after roasted is wet pulverized using a wet media mill containing pulverizing media having $3.0 \times 10^{-6}$ to $5.3 \times 10^{-4}$ cm$^3$/piece. A size of pulverizing media in this case is specified in order to adjust a particle size distribution. Thereby, while $D_{50}$ is made smaller, $D_{90}/D_{10}$ may be made smaller. And, the slurry after this finish pulverization may be used as an abrasive slurry as it is, and, thereby, classification step becomes unnecessary. In addition, before this finishing pulverization, extremely large particle is eliminated and the finish pulverization can be efficiently performed by cracking the roasted material.

In the above described pre pulverization step, main pulverization step, and finish pulverization step, the steps are performed by suitably adjusting a pulverization time etc. when it is a batch type, and also performed by suitably adjusting a number of times of passing. In addition, as examples of suitable wet media mills in the main pulverization step and the finish pulverization step, a planet ball mill, a sand mill, a beads mill, etc. may be mentioned.

Furthermore, it is also effective that a raw material after roasting is slurried and this slurry is filtered through a filter having a pore size of 0.5 to 5 μm. Especially this filtering is preferably performed for the slurry after subjected to the above described finish pulverization. It is because a slurry of the roasted material may have excessively large particle size distribution, and a long time of filtering may be required to provide a poor yield of the product. And as the filter, a filter of a type like a cartridge filter is applicable, and two or more filters having different pore sizes may be combined, and the raw material may be sequentially passed through them.

In view of a cost of transportation and storage, a slurry concentration of a cerium-based abrasive slurry manufactured by a method of the present invention, it is desirable to be set as high as possible. Therefore, the abrasive slurry manufactured may sometimes be concentrated. As concentration method, although a sedimentation thickening is commonly performed in which the abrasive slurry is left to stand to cause sedimentation of the abrasive particle and supernatant liquid is extracted, evaporation concentration is also applicable. In addition, the cerium-based abrasive slurry according to the present invention may be dried using a drying method hardly causing drying aggregation to obtain a cerium-based solid (powdered) abrasive.

In addition, as a raw material of a cerium-based abrasive according to the present invention, either one of a rare earth carbonate, or a calcined rare earth carbonate showing 1 to 40% (based on dry weight) of loss on ignition measured by being heated at 1000° C. for 1 hour is preferable. A reason these raw materials is preferable is because they have few fluorine contents, and pulverization of the raw material before roasting is comparatively easy, and further it is because it may be sintered moderately by roasting.

Here, a loss on ignition (hereinafter referred to as LOI (Loss On Ignition)) represents a weight percentage reduction at the time of igniting a subject. A range of LOI is set 1 to 40%, because pulverization may take long time for a raw material with less than 1% of LOI, and because sometimes it may have a large diameter of crystallite and excessively large lattice constant. And, an upper limit value is set 40%, because LOI of rare earth carbonate without calcination is approximately 40%, and it is difficult to calcine rare earth carbonate of LOI of more than 40%.

In addition, in measuring method of LOI, after introducing a raw material for an abrasive enough dried at 105° C. into a crucible measured weight beforehand and measuring the weight, it is heated at 1000° C. in a furnace for 1 hour, and, subsequently cooled under dry atmosphere, a weight of the crucible after cooling is measured, and then LOI is calculated according to following equation.

$$B=(W_1-W_2)/(W_1-W_3)\times 100 \qquad \text{Equation 1}$$

(B: loss on ignition (%),
$W_1$: Weight (g) of a raw material for an abrasive and a crucible before heating,
$W_2$: Weight (g) of the raw material for the abrasive and the crucible after heating,
$W_3$: Weight (g) of the crucible)

And, in a manufacturing step in case of using as a raw material a rare earth carbonate obtained by calcining this rare earth carbonate with loss on ignition of 1 to 40%, a step of calcining the rare earth carbonate is needed, and then this calcining temperature is preferably 400 to 800° C. It is because carbonic acid component is moderately discharged from the rare earth carbonate by calcining at this temperature. That is, it is because at no less than 800° C. transition to rare earth oxide becomes quick to make a perfect rare earth oxide, and at no more than 400° C. sufficient discharge of carbonic acid component and destruction of big and rough particle do not arise.

Figure 1:
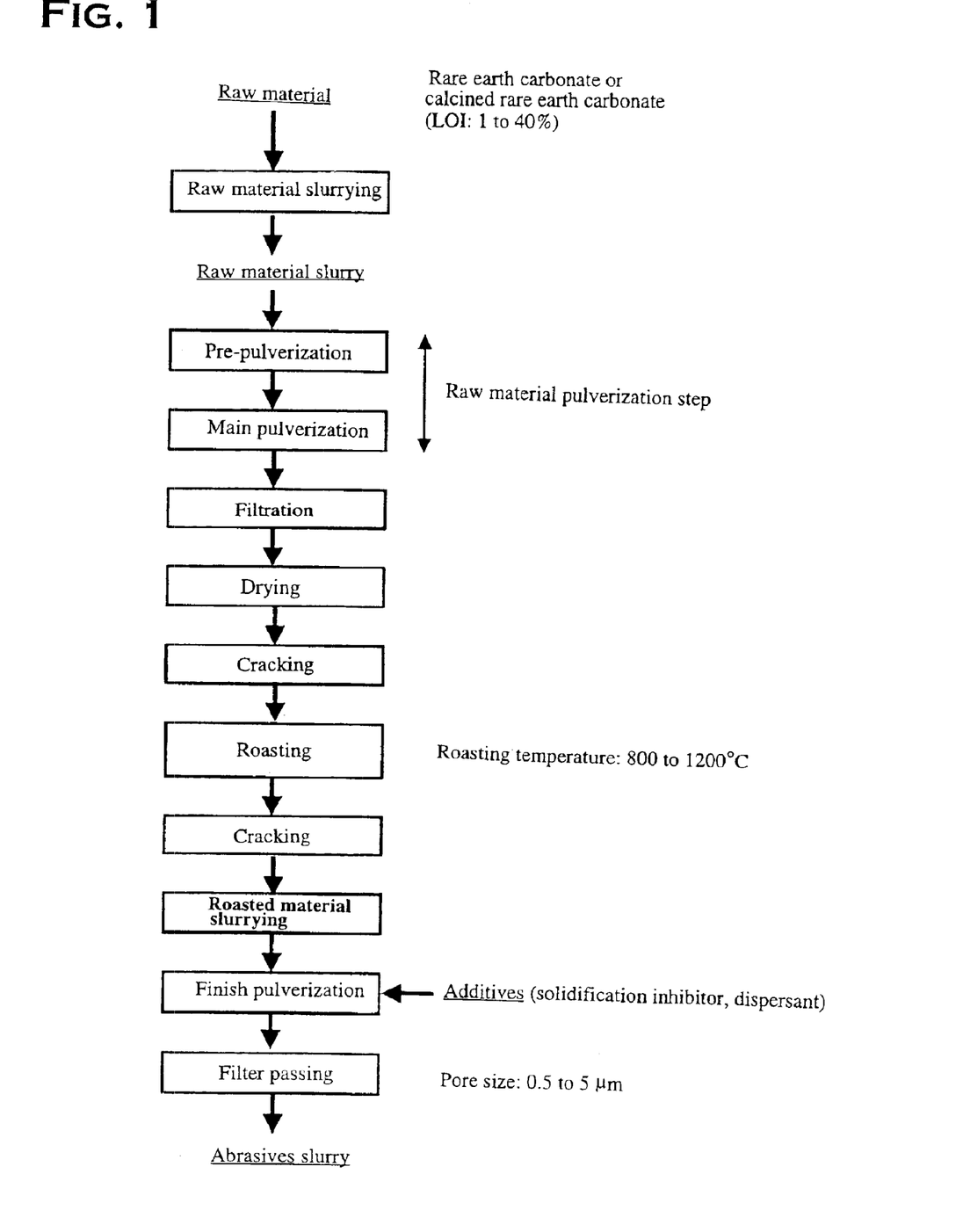
FIG. 1 shows suitable manufacturing steps of a cerium-based abrasive according to the present invention.

FIG. 1 shows suitable steps of a method for manufacturing a cerium-based abrasive slurry according to the present invention described above.

BEST MODE FOR CARRYING OUT THE INVENTION

Hereafter, suitable embodiments of the present invention will be described together with comparative examples.
First Embodiment:

Manufacturing steps of a cerium-based abrasive in this embodiment are same as that of FIG. 1. In this embodiment, after a pre pulverization and a main pulverization a raw material is dried and cracked. And after roasting a finish pulverization is performed, additives are added, filter passage is performed to manufacture an abrasive slurry. In addition, although an abrasive slurry is directly manufactured in this embodiment, manufacture of an solid cerium-based (powdered) abrasive is possible by drying a slurry after filter passage. In addition here, a final fluorine concentration of an abrasive slurry is adjusted by existence of fluorination treatment, and by adjustment of a roasting temperature.

<Raw material>: Raw material used here is a rare earth carbonate having following characteristics.

| | |
|---|---|
| TREO (based on dry weight) | 67% |
| Cerium oxide concentration (based on TREO) | 58% |
| Fluorine content (based on TREO) | 0.16% |
| Water content (loss on drying method) | 30% |
| Loss on ignition (based on dry weight) | 32% |

<Pre pulverization step of raw material>: The raw material 75 kg and pure water 125 L were introduced into a ball mill that uses steel ball with a diameter of 5 mm ($6.5\times 10^{-2}$ cm$^3$/piece) as pulverizing media, and pulverized for 4 hours, and thus a pre pulverization step was performed.

<Main pulverization step>: The raw material after the pre pulverization was supplied to a beads mill that uses zirconia ball with a diameter of 1.5 mm ($1.8\times 10^{-3}$ cm$^3$/piece) as pulverizing media, the raw material slurry was supplied at a rate of about 2 L/min, and was pulverized by a passing method, and here pulverization was performed 4 times (four passes) and thus main pulverization was performed.

Proper quantity of the raw material slurry after the above main pulverization was sampled and was introduced into 0.1% by weight of sodium hexametaphosphate aqueous solution, this was treated by ultrasonic dispersion for 10 minutes, and the solution was measured for a particle size distribution (measuring apparatus: SALD-2000A (manufactured by Shimadzu Corporation), measured by complex refractive index of 2.20-0.10i), and a cumulative 10% particle diameter ($D_{10}$) of 0.647 μm, a cumulative 50% particle diameter ($D_{50}$) of 1.583 μm, a cumulative 90% particle diameter ($D_{90}$) of 2.976 μm, and a maximum particle diameter ($D_{max}$) of 8.38 μm were obtained.

<Fluorination treatment step> Next, the raw material slurry after the main pulverization was equally divided by three samples, and a fluorination treatment was not given to a first sample and a following roasting step was performed, an ammonium fluoride solution was added to the remaining 2 samples so that a fluorine concentration in the raw material slurry (based on TREO) becomes 3% and 6%, respectively, and fluorination treatment was performed.

<Roasting step> The three samples of raw material slurries were filtered with a filter press, and heated and dried at 170° C., for 40 hours, and furthermore cracked with a roll crusher. And each of them was equally divided by two and roasted at temperatures shown below in Table 1, respectively. Roasting step was performed by maintaining at each temperature for 5 hours. And the raw material after roasting was cracked with a sample mill.

TABLE 1

| Fluorination treatment | Specimen No. | Roasting temperature |
| --- | --- | --- |
| Without fluorination treatment | 1 | 980° C. |
|  | 2 | 1020° C. |
| Fluorine concentration 3% | 3 | 980° C. |
|  | 4 | 920° C. |
| Fluorine concentration 6% | Comparative Example 1 | 980° C. |
|  | Comparative Example 2 | 850° C. |

<Finishing pulverization>: The raw material 5.4 kg after cracking was mixed into pure water 12.6 L and slurried, this was pulverized using a planet ball mill (number of rotations: revolution 200 rpm, rotation 300 rpm) that uses zirconia ball with a diameter of 0.3 mm ($1.4 \times 10^{-5}$ cm$^3$/piece) as pulverizing media for 2 hours by a batch method. To the raw material slurry after this pulverization, a solidification inhibitor (crystalline cellulose) and a dispersant (sodium hexametaphosphate) were added 0.4% and 0.7%, respectively, to the abrasive weight as additives. And the slurry after additive addition was sequentially passed through cartridge filters having 7 μm of pore size, and 3 μm of pore size, and obtained a cerium-based abrasive slurry.

After the six kinds of cerium-based abrasive slurries manufactured as mentioned above were measured for a particle size distribution, then they were dried at 105° C., and obtained samples were measured for a lattice constant, a diameter of crystallite, a specific surface area, and a fluorine concentration. Measurement of the specific surface area here was performed by a one point method for BET adsorption method and a gas flow method. And, measurement of fluorine concentration was performed with a heated hydrolysis separation/lanthanum-alizarin complexone absorption photometry. In addition, a value of fluorine concentration is converted into a fluorine concentration value per TREO 100 parts by weight from a fluorine concentration value in a slurry obtained by drying an abrasive slurry at 105° C., and a measured value of TREO in the dried abrasive slurry. These results are shown in Table 2.

TABLE 2

| No. | Roasting temperature (° C.) | F concentration (vs TREO %) | Particle size distribution (μm) | | | | X-ray diffraction | | Specific surface area (m²/g) |
| --- | --- | --- | --- | --- | --- | --- | --- | --- | --- |
|  |  |  | $D_{10}$ | $D_{50}$ | $D_{90}$ | $D_{max}$ | Lattice constant (nm) | Diameter of crystallite (nm) |  |
| 1 | 980 | 0.02 | 0.255 | 0.411 | 0.607 | 1.68 | 0.549 | 21 | 11.5 |
| 2 | 1020 | 0.014 | 0.302 | 0.488 | 0.723 | 1.68 | 0.551 | 28 | 9.3 |
| 3 | 980 | 2.5 | 0.283 | 0.536 | 0.772 | 2.51 | 0.547 | 37 | 9.1 |
| 4 | 920 | 2.7 | 0.241 | 0.507 | 0.690 | 2.05 | 0.548 | 33 | 11.2 |
| Comparative Example 1 | 980 | 4.9 | 0.328 | 0.749 | 1.513 | 3.75 | 0.545 | 55 | 7.4 |
| Comparative Example 2 | 850 | 5.3 | 0.217 | 0.520 | 0.783 | 2.51 | 0.547 | 40 | 11.2 |

And a glass material was polished with these abrasive slurries, a polishing value, and evaluation of polished face were carried out, and existence of residual abrasive on a polished face was further investigated by washing examination.

A glass material was polished with the use of a polishing apparatus employing a polishing pad made of polyurethane, using a glass for plane panel as a material to be polished. Polishing was performed under conditions of abrasive slurry at a rate of 5 L/min, a pressure to a polished face set as 5.9 kPa (0.06 kg/cm$^2$), and at a polishing apparatus rotation velocity of 100 rpm for 10 minutes. And a polishing value was evaluated through measuring a weight of the glass before and after polishing, and decrease in weight by polishing was calculated, and the value was relatively evaluated by setting a decrease in weight by an abrasive manufactured through a method according to No. 1 as 100. And, 300,000-lux halogen lamp was irradiated to a surface of the glass after polishing, the glass surface was observed through a reflection method, point attachment was performed based on size and number of scratches, and evaluation of a polished face was performed through a demerit point method from full marks.

And, in washing property examination, after polishing was performed for 10 minutes under the above described polishing examination conditions, a glass as a material to be polished was dipped in pure water for 10 minutes, rinsing processing of dipping in pure water-removing out was repeated 3 times, and soil of a polished face was observed in a dark view of an optical microscope after dried. And relative comparison of results of washing property examination in each abrasive was carried out on the basis of washing result in Comparative Example 1 to evaluate each washing property.

Figure 2:
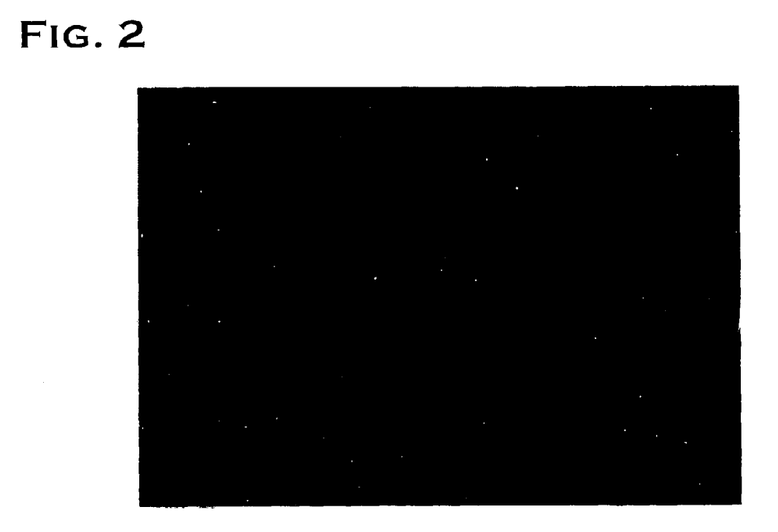
FIG. 2 shows a photograph of a state on a surface of a glass of specimen 1 in a First Embodiment after adhesion examination.
Figure 3:
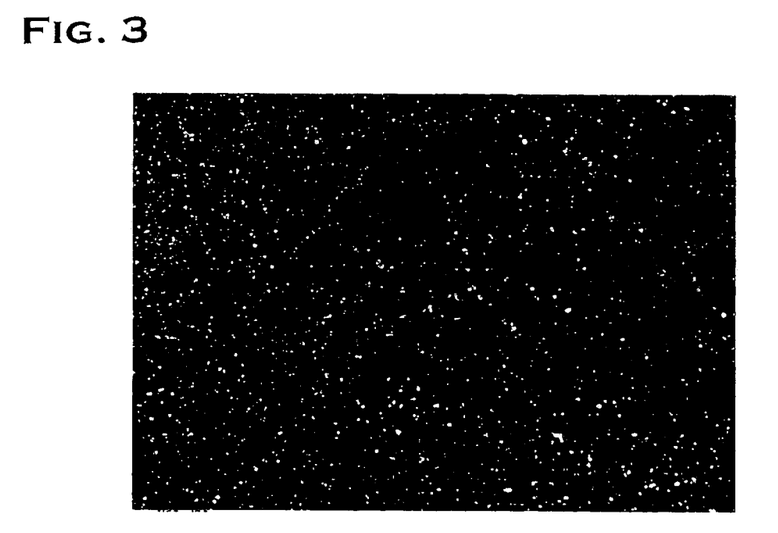
FIG. 3 shows a photograph of a state on a surface of a glass of specimen 3 in a First Embodiment after adhesion examination.
Figure 4:
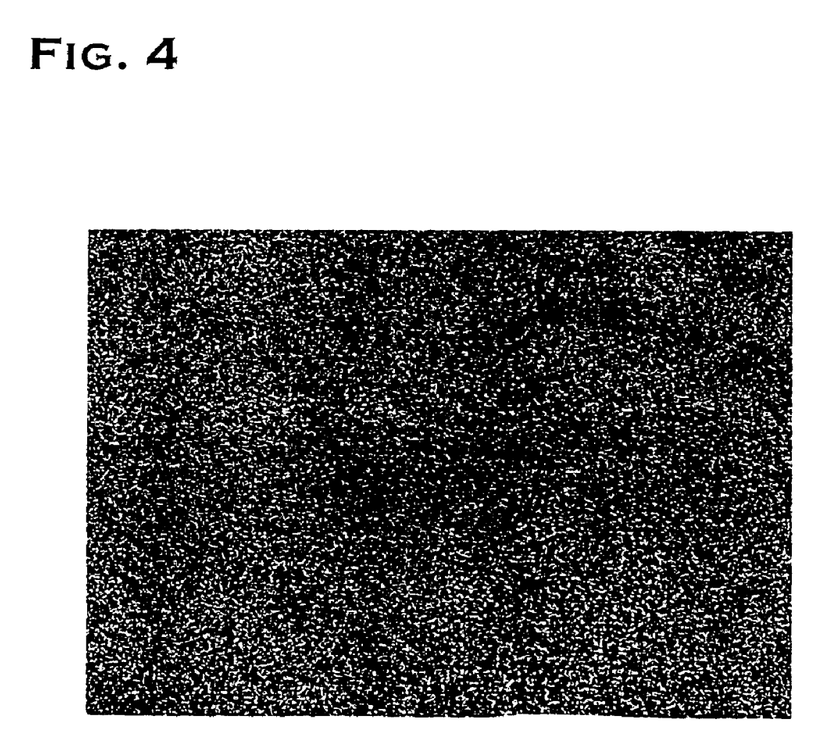
FIG. 4 shows a photograph of a state on a surface of a glass of Comparative Example 1 in a First Embodiment after adhesion examination.

Polishing values, evaluation of polished face, and adhesion examination evaluation results by polishing of the glass materials are shown in Table 3. And, photographs of surface of the glass after an adhesion examination of specimens No. 1, 3, and of a Comparative Example 1 are shown in FIGS. 2 to 4. In addition, in these photographs, cerium-based abrasive remained on polished surface is displayed as white dots.

pulverization step, the roasting step, and the finishing pulverization step was modified to manufacture an abrasive slurry. Three-pass pulverization was performed as the main pulverization here using a beads mill using zirconia ball with a diameter of 1.0 mm ($5.2 \times 10^{-4}$ cm$^3$/piece) as pulverizing media. When a particle size distribution was measured for the raw material after the main pulverization, 0.483 μm of cumulative 10% particle diameter ($D_{10}$), 1.027 μm of cumulative 50% particle diameter ($D_{50}$), and 2.138 μm of cumulative 90% particle diameter ($D_{90}$) were obtained, and 5.60 μm of maximum particle diameter ($D_{max}$) were obtained. And in roasting step, temperatures were set to 750° C., 950° C., 980° C., 1020° C., and 1050° C. Furthermore, in the

TABLE 3

| No. | Roasting temperature (° C.) | F concentration (vs TREO %) | Polishing examination result |  |  |
|---|---|---|---|---|---|
|  |  |  | Polishing value | Evaluation of polished face | Adhesion examination |
| 1 | 980 | 0.02 | 100 | 100 | E |
| 2 | 1020 | 0.014 | 115 | 100 | E |
| 3 | 980 | 2.5 | 135 | 100 | G |
| 4 | 920 | 2.7 | 121 | 100 | G |
| Comparative Example 1 | 980 | 4.9 | 173 | 90 | P |
| Comparative Example 2 | 850 | 5.3 | 131 | 96 | P |

E: No Residue (adhesion) observed, (very suitable for final polishing)
G: Slight residue (adhesion) observed, (suitable for final polishing)
P: Adhesion observed (not usable for final polishing)

From results of the present Embodiments and Comparative Examples described above, in abrasive slurries concerning Comparative Examples, although a polishing value was high, it was inferior in accuracy of polished face, and existence of an adhesion particle notable in the polished face after polishing was confirmed. It is probably based on fluorine included in specimens in Comparative Examples. On the other hand, no such problems were observed in the abrasive slurries concerning the present Embodiments, and adhesive problem was not observed at all especially in the specimens with no more than 0.1% of fluorine concentration. This may be agreeable clearly also from FIGS. 2 to 4, and in the abrasive slurries of specimen No. 1 and 3, it turns out adhesion of an abrasive particle was improved better than in the specimen of Comparative Example 1.

finishing pulverization, a planet ball mill (number of turn: revolution 200 rpm, rotation 300 rpm) using zirconia ball with a diameter of 0.65 mm ($1.4 \times 10^{-4}$ cm$^3$/piece) as pulverizing media was used, and pulverization was performed for 2.5 hours or 3 hours. As other steps, same steps as in First Embodiment were adopted.

Five kinds of cerium-based abrasive manufactured as mentioned above were measured for a particle size distribution, a lattice constant, a diameter of crystallite, and a specific surface area. Results are shown in Table 4.

TABLE 4

| No. | Roasting temperature (° C.) | Finish pulverizing time (h) | F concentration (vs TREO %) | Particle size distribution (μm) |  |  |  | X-ray diffraction |  | Specific surface area (m$^2$/g) |
|---|---|---|---|---|---|---|---|---|---|---|
|  |  |  |  | $D_{10}$ | $D_{50}$ | $D_{90}$ | $D_{max}$ | Lattice constant (nm) | Diameter of crystallite (nm) |  |
| 5 | 750 | 2.5 | 0.075 | 0.258 | 0.437 | 0.673 | 2.51 | 0.542 | 8.8 | 16.7 |
| 6 | 950 | 3 | 0.025 | 0.228 | 0.347 | 0.546 | 1.37 | 0.548 | 17 | 14.6 |
| 7 | 980 | 3 | 0.019 | 0.259 | 0.423 | 0.620 | 1.68 | 0.549 | 22 | 11.7 |
| 8 | 1020 | 3 | 0.014 | 0.305 | 0.491 | 0.735 | 1.68 | 0.551 | 28 | 9.4 |
| 9 | 1050 | 3 | 0.008 | 0.330 | 0.576 | 0.789 | 2.05 | 0.553 | 35 | 7.3 |

Second Embodiment:

This embodiment has fundamentally same details as in the No. 1 of First Embodiment, but each step of the main And after polishing of glass materials was performed using these abrasives, polishing values, evaluation of polished face, existence of residual abrasives to a polished face were investigated to obtain results in Table 5.

TABLE 5

| No. | Roasting temperature (° C.) | Finish pulverizing time (h) | F concentration (vs TREO %) | Polishing examination result | | Adhesion examination |
|---|---|---|---|---|---|---|
| | | | | Polishing value | Evaluation of polished face | |
| 5 | 750 | 2.5 | 0.075 | 37 | 100 | E |
| 6 | 950 | 3 | 0.025 | 89 | 100 | E |
| 7 | 980 | 3 | 0.019 | 103 | 100 | E |
| 8 | 1020 | 3 | 0.014 | 117 | 100 | E |
| 9 | 1050 | 3 | 0.008 | 137 | 100 | E |

E: No residue (adhesion) observed, (very suitable for final polishing)

Third Embodiment:

As in the Second Embodiment, each step of a main pulverization step, a roasting step, and a finishing pulverization step was modified to manufacture abrasive slurries. In a main pulverization here, a beads mill using zirconia ball with a diameter of 0.65 mm ($1.4 \times 10^{-4}$ cm$^3$/piece) as pulverizing media was used, and 2 pass-pulverization was performed by a passage method with an amount of 2 L/minute of liquid delivery. When a particle size distribution was measured for the raw material after the main pulverization, 0.523 μm of cumulative 10% particle diameter ($D_{10}$), 1.203 μm of cumulative 50% particle diameter ($D_{50}$), and 2.335 μm of cumulative 90% particle diameter ($D_{90}$) were obtained, and 6.85 μm of maximum particle diameter ($D_{max}$) was obtained. And a roasting temperatures were unified to 980° C. in a roasting step, and in a finishing pulverization, a beads mill using zirconia ball with a diameter of 0.4 mm ($3.4 \times 10^{-5}$ cm$^3$/piece) as pulverizing media was used to perform 2 to 8 pass-pulverization by a passage method with an amount of 1 L/minute of liquid delivery. Furthermore, adjustment was variously performed for a pore size of filters after the finish pulverization to 3 to 7 μm, and 6 kinds of abrasive slurries were manufactured.

Six kinds of cerium-based abrasives manufactured as mentioned above were measured for a particle size distribution, a lattice constant, a diameter of crystallite, and a specific surface area. Results are shown in Table 6.

TABLE 6

| No. | Number of finishing passes | Filter | F concentration (vs TREO %) | Particle size distribution (μm) | | | | Lattice constant (nm) | Diameter of crystallite (nm) | Specific surface area (m$^2$/g) |
|---|---|---|---|---|---|---|---|---|---|---|
| | | | | $D_{10}$ | $D_{50}$ | $D_{90}$ | $D_{max}$ | | | |
| 10 | 2 | 10, 7 | 0.020 | 0.623 | 1.225 | 2.725 | 5.60 | 0.550 | 21 | 5.8 |
| 11 | 3 | 10, 7, 5 | 0.021 | 0.435 | 0.762 | 1.225 | 3.75 | 0.549 | 21 | 7.6 |
| 12 | 4 | 10, 5, 3 | 0.020 | 0.326 | 0.518 | 0.786 | 2.05 | 0.549 | 21 | 9.4 |
| 13 | 5 | 10, 5, 3 | 0.020 | 0.248 | 0.402 | 0.597 | 1.68 | 0.549 | 21 | 11.3 |
| 14 | 6 | 10, 5, 3 | 0.020 | 0.138 | 0.267 | 0.383 | 1.37 | 0.549 | 21 | 14.4 |
| 15 | 8 | 10, 5, 3 | 0.019 | 0.075 | 0.132 | 0.285 | 1.12 | 0.548 | 20 | 19.5 |

And after polishing of glass materials was performed using these abrasives, a polishing value, evaluation of polished face, existence of residual abrasives to a polished face were investigated to obtain results in Table 7.

TABLE 7

| | | | | Polishing examination result | | |
|---|---|---|---|---|---|---|
| No. | Number of finishing passes | Filter | F concentration (vs TREO %) | Polish value | Evaluation of polished face | Adhesion examination |
| 10 | 2 | 10, 7 | 0.020 | 178 | 95 | E |
| 11 | 3 | 10, 7, 5 | 0.021 | 142 | 98 | E |
| 12 | 4 | 10, 5, 3 | 0.020 | 115 | 100 | E |
| 13 | 5 | 10, 5, 3 | 0.020 | 99 | 100 | E |
| 14 | 6 | 10, 5, 3 | 0.020 | 72 | 100 | G |
| 15 | 8 | 10, 5, 3 | 0.019 | 33 | 100 | F |

E: No Residue (adhesion) observed, (very suitable for final polishing)
G: Slight residue (adhesion) observed, (suitable for final polishing)
F: Middle degree of residue (adhesion) observed, (usable for final polishing, but washing necessary)
P: Adhesion observed (not usable for final polishing)

Fourth Embodiment:

In this embodiment, after a method of a pre pulverization step was variously modified, a main pulverization, a roasting, etc. were performed to manufacture abrasive slurries by obtained specimens. And, a step was also carried out in which a pre pulverization was not performed for comparison. Methods of a pre pulverization are shown below.

(Wet Pulverization)

Raw material 25 kg and pure water 40 L were introduced into a ball mill using steel ball with a diameter of 5 mm ($6.5 \times 10^{-2}$ cm$^3$/piece) as pulverizing media, and pulverization was performed as a pre pulverization step for 4 hours.

(Dip Heating Pulverization)

Raw material 25 kg was dipped in water 40 L, and this was left to stand for 20 minutes heated at 80° C.

(Dry Pulverization)

Raw material 25 kg was dried at 150° C. and subsequently pulverized using a jet mill.

In a main pulverization, 2 pass-pulverization was performed for the raw material after the above described pre pulverization using a beads mill using zirconia ball with a diameter of 0.65 mm ($1.4 \times 10^{-4}$ cm3/piece) as pulverizing media by a passage method with an amount of 2 L/minute of liquid delivery. However, without pre pulverization, 2-pass method gave excessively large $D_{50}$, so that 4-pass pulverization was performed only in this case. The raw material after this main pulverization was measured for a particle size distribution, and particle size distributions as shown below in Table 8 were obtained.

TABLE 8

| | Pre pulverization | Particle size distribution (μm) | | | |
|---|---|---|---|---|---|
| No. | method | $D_{10}$ | $D_{50}$ | $D_{90}$ | $D_{max}$ |
| 16 | Wet pulverization | 0.523 | 1.203 | 2.335 | 6.85 |
| 17 | Dip heating pulverization | 0.532 | 1.137 | 2.149 | 5.60 |
| 18 | Dry pulverization | 0.374 | 1.226 | 2.957 | 10.25 |
| 19 | None | 0.328 | 1.277 | 3.894 | 18.73 |

And these raw materials after the main pulverization were roasted unifying roasting temperatures to 980° C., as a finishing pulverization 5-pass pulverization was performed by a passage method with an amount of 1 L/minute of liquid delivery, using a beads mill using zirconia ball with a diameter of 0.4 mm ($3.4 \times 10^{-5}$ cm$^3$/piece) as pulverizing media. Furthermore, after the finish pulverization, specimens were passed through filters of 10, 5, and 3 μm, and abrasive slurries were manufactured.

Four kinds of cerium-based abrasives manufactured as mentioned above were measured for a particle size distribution, a lattice constant, a diameter of crystallite, and a specific surface area. Results are shown in Table 9.

TABLE 9

| | | | | | | | X-ray diffraction | | |
|---|---|---|---|---|---|---|---|---|---|
| | Pre pulverization | F concentration | Particle size distribution (μm) | | | | Lattice constant | Diameter of crystallite | Specific surface area |
| No. | method | (vs TREO %) | $D_{10}$ | $D_{50}$ | $D_{90}$ | $D_{max}$ | (nm) | (nm) | (m$^2$/g) |
| 16 | Wet pulverization | 0.020 | 0.248 | 0.402 | 0.597 | 1.68 | 0.549 | 21 | 11.3 |
| 17 | Dip heating pulverization | 0.019 | 0.242 | 0.379 | 0.553 | 1.37 | 0.549 | 21 | 12.3 |
| 18 | Dry pulverization | 0.021 | 0.192 | 0.411 | 0.732 | 2.05 | 0.549 | 21 | 11.0 |
| 19 | None | 0.020 | 0.183 | 0.425 | 0.937 | 4.58 | 0.549 | 21 | 10.7 |

And after polishing of glass materials was performed using these abrasives, polishing values, evaluation of polished face, existence of residual abrasives to a polished face were investigated to obtain results in Table 10.

TABLE 10

| No. | Pre pulverization method | F concentration (vs TREO %) | Polishing examination result | | |
|---|---|---|---|---|---|
| | | | Polishing value | Evaluation of polished face | Adhesion examination |
| 16 | Wet pulverization | 0.020 | 99 | 100 | E |
| 17 | Dip heating pulverization | 0.019 | 107 | 100 | E |
| 18 | Dry pulverization | 0.021 | 88 | 100 | G |
| 19 | None | 0.020 | 83 | 99 | G |

E: No residue (adhesion) observed
G: Slight residue (adhesion) observed

It was confirmed that good results were obtained from the results of this Fourth Embodiment even if a method of the pre pulverization was changed.

Fifth Embodiment:

Next, abrasives were manufactured using same manufacturing step as specimen No. 9 of the Second Embodiment so that a specific surface area of the abrasives was set to be 7 $m^2/g$. In this step, addition concentrations of an additive were modified to manufacture abrasive slurries, and in addition to polishing examination and washing examination, a sedimentation test and a precipitation cake hardness test were performed for the obtained specimens. Crystalline cellulose and sodium hexametaphosphate were used as additives here. And, an amount of addition was set to 0 to 1.5% to abrasive weight based on the specific surface area of the obtained abrasive.

Here, in a sedimentation test, after each abrasive slurry is diluted so that abrasive concentration may be 5% by weight, the obtained mixture was stirred enough, and then this abrasive slurry was introduced into 2000 ml measuring cylinder, gauge of the interface between a suspension phase and a dispersion medium phase (pure water) in the abrasive slurry was read to investigate the sedimentation property. And a capacity of the suspension phase after 60 minutes in a state of gentle placement was measured after introducing the abrasive slurry to the measuring cylinder, and an evaluation value of this sedimentation test was obtained by calculating a percentage (%) of the measured suspension phase capacity to a total abrasive slurry capacity (2000 ml).

And, in a precipitation cake hardness test, each abrasive slurry was introduced into a predetermined container, and kept in a gentle placement state for 48 hours to obtain a precipitation of abrasive particle as a precipitation cake, and a hardness of the precipitation cake was investigated. Specifically, after a precipitation cake was formed, operation holding the container upside down and loosing the cake was carried out once 2 seconds, and this operation was repeated up to 100 times.

Results of this Embodiment are shown in Table 11. A content of crystalline cellulose and sodium hexametaphosphate are shown divided in lines and columns, respectively in Table 11, and results of polishing examination, a precipitation cake hardness test, washing property examination, and a sedimentation test carried out, respectively, are shown. In addition, the precipitation cake hardness test result was estimated by number of times of operation until a precipitation cake became completely loosened.

TABLE 11

| | | | Crystalline cellulose (wt %) | | | | | |
|---|---|---|---|---|---|---|---|---|
| | Amount of addition | | 0 | 0.03 | 0.10 | 0.50 | 1.2 | 1.5 |
| Sodium hexametaphosphate (wt %) | 0 | A | 103 | 101 | 98 | 87 | 84 | 80 |
| | | B | F | G | E | E | E | E |
| | | C | E | E | E | E | E | E |
| | | D | 31 | 45 | 50 | 56 | 47 | 39 |
| | 0.03 | A | 105 | 105 | 105 | 102 | 95 | 85 |
| | | B | F | G | E | E | E | E |
| | | C | E | E | E | E | E | E |
| | | D | 45 | 53 | 59 | 69 | 69 | 49 |
| | 0.10 | A | 106 | 107 | 113 | 126 | 117 | 92 |
| | | B | F | G | G | E | E | E |
| | | C | G | E | E | E | E | E |
| | | D | 59 | 70 | 98 | 99 | 98 | 60 |
| | 0.50 | A | 109 | 108 | 117 | 137 | 124 | 96 |
| | | B | P | F | G | E | E | E |
| | | C | G | G | E | E | E | E |
| | | D | 71 | 75 | 99 | 100 | 99 | 63 |
| | 1.2 | A | 111 | 113 | 120 | 139 | 128 | 100 |
| | | B | P | F | G | E | E | E |
| | | C | G | G | G | E | E | E |
| | | D | 70 | 73 | 98 | 99 | 98 | 59 |
| | 1.5 | A | 114 | 117 | 124 | 140 | 129 | 102 |
| | | B | P | F | G | G | E | E |
| | | C | F | G | G | G | E | E |
| | | D | 58 | 60 | 66 | 71 | 63 | 53 |

Line A; Polish value (sample 1 of First embodiment set to 100)
Line B; Pecipitation cake hardness
E: Very good (no more than 5 times)
G: Good (no more than 20 times)
F: Medium (no more than 100 times)
P: Poor (more than 100 times)
Line C; Washing property
E: No residue (adhesion) observed
G: Slight residue (adhesion) observed
F: Residue of medium degree (adhesion) observed
P: Adhesion observed
Line D; Volume percentage of suspension phase at 60 minutes after abrasives slurry preparation (%)

Sixth Embodiment:

Next, abrasives were manufactured by a same manufacturing step as specimen No. 13 in the Third Embodiment so that a specific surface area of the abrasive may be set 11 $m^2/g$. In this step, addition concentration of additives was modified to manufacture abrasive slurries, and in addition to polishing examination and washing examination, for them, a sedimentation test and a precipitation cake hardness test were performed. As additives here, crystalline cellulose and sodium hexametaphosphate were used. And, an amount of addition was set as 0 to 2.5% based on a weight of the abrasives according to a specific surface area of the obtained abrasives. Results are shown in Table 12.

TABLE 12

|  |  | Crystalline cellulose (wt %) | | | | | |
|---|---|---|---|---|---|---|---|
|  | Amount of addition | 0 | 0.08 | 0.13 | 0.80 | 2.0 | 2.5 |
| Sodium hexametaphosphate (wt %) | 0 | A 68<br>B F<br>C E<br>D 39 | A 68<br>B G<br>C E<br>D 48 | A 64<br>B E<br>C E<br>D 53 | A 58<br>B E<br>C E<br>D 59 | A 53<br>B E<br>C E<br>D 52 | A 50<br>B E<br>C E<br>D 43 |
|  | 0.08 | A 71<br>B P<br>C E<br>D 51 | A 70<br>B G<br>C E<br>D 57 | A 67<br>B E<br>C E<br>D 63 | A 65<br>B E<br>C E<br>D 71 | A 60<br>B E<br>C E<br>D 56 | A 58<br>B E<br>C E<br>D 53 |
|  | 0.13 | A 73<br>B P<br>C G<br>D 63 | A 73<br>B G<br>C E<br>D 74 | A 80<br>B G<br>C E<br>D 98 | A 95<br>B E<br>C E<br>D 100 | A 83<br>B E<br>C E<br>D 98 | A 65<br>B E<br>C E<br>D 65 |
|  | 0.80 | A 76<br>B P<br>C G<br>D 76 | A 77<br>B F<br>C G<br>D 78 | A 89<br>B G<br>C E<br>D 99 | A 102<br>B E<br>C E<br>D 100 | A 94<br>B E<br>C E<br>D 99 | A 72<br>B E<br>C E<br>D 70 |
|  | 2.0 | A 79<br>B P<br>C G<br>D 72 | A 80<br>B F<br>C G<br>D 75 | A 91<br>B G<br>C G<br>D 99 | A 105<br>B E<br>C E<br>D 99 | A 98<br>B E<br>C E<br>D 98 | A 74<br>B E<br>C E<br>D 61 |
|  | 2.5 | A 82<br>B P<br>C F<br>D 63 | A 84<br>B F<br>C G<br>D 66 | A 93<br>B G<br>C G<br>D 70 | A 106<br>B G<br>C G<br>D 73 | A 99<br>B E<br>C G<br>D 65 | A 74<br>B E<br>C E<br>D 57 |

Line A; Polish value (sample 1 of First embodiment set to 100)
Line B; Pecipitation cake hardness
E: Very good (no more than 5 times)
G: Good (no more than 20 times)
F: Medium (no more than 100 times)
P: Poor (more than 100 times)
Line C; Washing property
E: No residue (adhesion) observed
G: Slight residue (adhesion) observed
F: Residue of medium degree (adhesion) observed
P: Adhesion observed
Line D: Volume percentage of suspension phase at 60 minutes after abrasives slurry preparation (%)

Seventh Embodiment:

Furthermore, abrasives were manufactured by a same manufacturing step as specimen No. 5 in the Second Embodiment so that a specific surface area of the abrasive may be set 17 m²/g. In this step, addition concentration of additives was modified to manufacture abrasive slurries, and in addition to polishing examination and washing examination, for them, a sedimentation test and a precipitation cake hardness test were performed. As additives here, crystalline cellulose and sodium hexametaphosphate were used. And, an amount of addition was set as 0 to 4.0% based on a weight of the abrasives according to a specific surface area of the obtained abrasives. Results are shown in Table 13.

TABLE 13

|  |  | Crystalline cellulose (wt %) | | | | | |
|---|---|---|---|---|---|---|---|
|  | Amount of addition | 0 | 0.13 | 0.20 | 1.1 | 3.0 | 4.0 |
| Sodium hexametaphosphate (wt %) | 0 | A 55<br>B F<br>C E<br>D 51 | A 54<br>B G<br>C E<br>D 55 | A 51<br>B E<br>C E<br>D 59 | A 46<br>B E<br>C E<br>D 62 | A 42<br>B E<br>C E<br>D 53 | A 40<br>B E<br>C E<br>D 49 |
|  | 0.13 | A 58<br>B P<br>C E<br>D 62 | A 58<br>B G<br>C E<br>D 67 | A 57<br>B E<br>C E<br>D 71 | A 55<br>B E<br>C E<br>D 75 | A 53<br>B E<br>C E<br>D 61 | A 48<br>B E<br>C E<br>D 57 |
|  | 0.20 | A 60<br>B P<br>C G<br>D 70 | A 62<br>B G<br>C E<br>D 75 | A 75<br>B G<br>C E<br>D 99 | A 82<br>B E<br>C E<br>D 100 | A 77<br>B E<br>C E<br>D 98 | A 60<br>B E<br>C E<br>D 69 |
|  | 1.1 | A 62<br>B P<br>C G<br>D 78 | A 63<br>B F<br>C G<br>D 79 | A 80<br>B G<br>C E<br>D 99 | A 85<br>B E<br>C E<br>D 99 | A 82<br>B E<br>C E<br>D 98 | A 63<br>B E<br>C E<br>D 65 |
|  | 3.0 | A 64<br>B P<br>C G<br>D 75 | A 64<br>B F<br>C G<br>D 77 | A 82<br>B G<br>C G<br>D 99 | A 88<br>B E<br>C E<br>D 99 | A 85<br>B E<br>C E<br>D 98 | A 67<br>B E<br>C E<br>D 65 |
|  | 4.0 | A 65<br>B P<br>C F<br>D 68 | A 66<br>B F<br>C G<br>D 71 | A 83<br>B G<br>C G<br>D 76 | A 88<br>B G<br>C G<br>D 79 | A 86<br>B E<br>C E<br>D 69 | A 69<br>B E<br>C E<br>D 61 |

Line A; Polish value (sample 1 of First embodiment set to 100)
Line B; Pecipitation cake hardness
E: Very good (no more than 5 times)
G: Good (no more than 20 times)
F: Medium (no more than 100 times)
P: Poor (more than 100 times)
Line C; Washing property
E: No residue (adhesion) observed
G: Slight residue (adhesion) observed
F: Residue of medium degree (adhesion) observed
P: Adhesion observed
Line D; Volume percentage of suspension phase at 60 minutes after abrasives slurry preparation (%)

As is clearly shown in Fifth to Seventh Embodiments, it was confirmed that a range of the addition concentration of additives in which coexistence of polishing properties and adhesion (range surrounded by the thick line in each table) is expectable is varied in each embodiment, i.e., according to a specific surface area of the abrasives. And proper ranges of amount of addition of the solidification inhibitor and dispersant were 0.1 to 1.2% by weight in the Fifth Embodiment (specific surface area of about 7 m²/g), 0.13 to 2.0% by weight in the Sixth Embodiment (specific surface area of about 11 m²/g), and 0.2 to 3.0% by weight in the Seventh embodiment (specific surface area of about 17 m²/g). All of the content of these additives are within a range of S/100 to S/5 g to 100 g of abrasive particles, when defining the specific surface area of the cerium-based abrasive as S (m²/g).

Eighth Embodiment:

Finally, as is shown in Table 15, combination of a solidification inhibitor and a dispersant was varied to carry out evaluation. In evaluation, polishing examination, precipitation cake hardness test, washing property examination, and sedimentation test as in the above described embodiments were performed. As abrasive slurries used for evaluation, specimens manufactured as the abrasive slurry of the First Embodiment specimen No. 1 were used. Results are shown according to Table 14.

TABLE 14

| Solidification inhibitor (0.3 wt %) | Dispersant (0.3 wt %) | A | B | C | D |
|---|---|---|---|---|---|
| Alginic acid propylene glycol ether | Sodium polyacrylate | 100 | E | E | 100 |
| Alginic acid propylene glycol ether | Sodium hexametaphosphorate | 99 | E | E | 100 |
| Alginic acid propylene glycol ether | Sodium polystyrene sulfonate | 98 | E | E | 100 |
| Crystalline cellulose + sodium carboxymethylcellulose | Sodium polyacrylate | 100 | E | E | 100 |
| Crystalline cellulose + sodium carboxymethylcellulose | Sodium hexametaphosphorate | 105 | E | E | 100 |
| Crystalline cellulose + sodium carboxymethylcellulose | Sodium polystyrene sulfonate | 99 | E | E | 100 |
| Synthetic silica | Sodium polyacrylate | 97 | E | E | 100 |
| Calcium secondary phosphate | Sodium polyacrylate | 100 | E | E | 100 |
| Sodium β-naphthalene sulfonate formalin condensate | Sodium polyacrylate | 100 | E | E | 100 |

Line A; Polish value (sample 1 of First embodiment set to 100)
Line B; Pecipitation cake hardness
E: Very good (no more than 5 times)
Line C; Washing property
E: No residue (adhesion) observed
Line D; Volume percentage of suspension phase at 60 minutes after abrasives slurry preparation (%)

As is shown in Table 14, it became clear that characteristics of abrasives of these nine kinds of combination were almost equivalent to the characteristics data of the abrasive including a same quantity of crystalline cellulose and sodium hexametaphosphate in the First Embodiment.

Industrial Applicability

As is described above, in a cerium-based abrasive according to the present invention, a particle size distribution of the abrasive particle is adjusted by controlling a size of pulverizing media in pulverization, and operation of pre pulverization, adjustment of roasting temperature, and implementation of finish pulverization are further suitably performed. And while a cerium-based abrasive according to the present invention provides excellent polishing power and polishing accuracy, it does not form adhesion of abrasive particles or blemish on a polished face after polishing to maintain a highly precise specular surface.

What is claimed is:

1. An abrasive slurry including abrasive particles containing cerium, no less than 95% by weight of total rare earth oxides (TREO) and less than 3% by weight of fluorine relative to TREO, wherein the abrasive particles have a cumulative 10% particle diameter ($D_{10}$) of no less than 0.1 μm and no greater than 0.6 μm, a cumulative 50% particle diameter ($D_{50}$) of no less than 0.2 μm and no greater than 1.0 μm, a cumulative 90% particle diameter ($D_{90}$) of no less than 0.3 μm and no greater than 1.5 μm, and a maximum particle diameter ($D_{max}$) of no less than 0.5 μm and no greater than 5.0 μm, and wherein $D_{10}$, $D_{50}$, $D_{90}$ and $D_{max}$ are measured by a laser diffraction method.

2. The abrasive slurry according to claim 1, wherein the fluorine is from 0.005 to 0.5% by weight of TREO.

3. The abrasive slurry according to claim 1, in which crystallites constituting the abrasive particles containing cerium have a diameter of 10 to 50 nm and a lattice constant measured by a powder x-ray diffraction method of 0.545 to 0.555 nm.

4. The abrasive slurry according to claim 1, in which a specific surface area measured by a BET adsorption method in dry state is 3 to 30 m$^2$/g.

5. The abrasive slurry according to claim 1, further comprising cerium oxide, wherein the ratio of cerium oxide to TREO is no less than 30% by weight.

6. The abrasive slurry according to claim 1, having at least one of a solidification inhibitor and a dispersant.

7. The abrasive slurry according to claim 1, in which a content of a solidification inhibitor and a dispersant in 100 g of the abrasive particles is S/100 to S/5 (g) when defining a specific surface area of the abrasive slurry in a dry state as S (m$^2$/g).

8. A method for forming abrasive particles containing cerium, comprising pulverizing an abrasive raw material containing cerium followed by roasting the pulverized abrasive raw material, wherein the pulverizing step comprises a main pulverizing step in which a raw material slurry including the abrasive raw material is pulverized with a wet media mill containing pulverizing media having a $1.4 \times 10^{-5}$ to $4.2 \times 10^{-3}$ cm$^3$/piece of average volume, and wherein the abrasive particles contain no less than 95% by weight of total rare earth oxides (TREO) and less than 3% by weight of fluorine relative to TREO, and wherein the abrasive particles have a cumulative 10% particle diameter ($D_{10}$) of no less than 0.1 μm and no greater than 0.6 μm, a cumulative 50% particle diameter ($D_{50}$) of no less than 0.2 μm and no greater than 1.0 μm, a cumulative 90% particle diameter ($D_{90}$) of no less than 0.3 μm and no greater than 1.5 μm, and a maximum particle diameter ($D_{max}$) of no less than 0.5 μm and no greater than 5.0 μm, and wherein $D_{10}$, $D_{50}$, $D_{90}$ and $D_{max}$ are measured by a by a laser diffraction method.

9. The method according to claim 8, wherein the pulverizing step further comprises a wet pulverizing step carried out prior to the main pulverizing step by pulverizing media having an average volume of 1.4 to 1000 times that of the pulverizing media used in the main pulverizing step.

10. The method according to claim 8, in which the pulverizing step further comprises a step in which the abrasive raw material is dipped in an aqueous solution at 60° C. to 100° C. either before or after the main pulverizing step.

11. The method according to claim 8, in which the pulverizing step further comprises dry pulverizing the abrasive raw material before the main pulverizing step.

12. The method according to claim 8, wherein the roasting step is carried out at a temperature of 800 to 1200° C.

13. The method according to claim 8, further comprising conducting a finishing pulverizing step after the roasting step, wherein the finishing pulverizing step is performed on the abrasive raw material by a wet media mill containing pulverizing media of $3.0 \times 10^{-6}$ to $5.3 \times 10^{-4}$ cm$^3$/piece.

14. The method according to claim 8, further comprising a step in which the roasted abrasive raw material is passed through a filter with a pore size of from 0.5 to 5 μm.

15. The method according to claim 8, wherein the abrasive raw material is either a rare earth carbonate, or a calcined rare earth carbonate having a loss on ignition, based on dry weight, of 1 to 40%, wherein loss of ignition is measured by heating at 1000° C. for 1 hour.

* * * * *